United States Patent
Jones et al.

(10) Patent No.: US 10,929,542 B2
(45) Date of Patent: Feb. 23, 2021

(54) SOFTWARE POLICY ENGINE IN VIRTUAL ENVIRONMENT

(71) Applicant: Raytheon Company, Waltham, MA (US)

(72) Inventors: Frederick K. Jones, Tucson, AZ (US); Uzma Nishat, Sahuarita, AZ (US); Geoffrey G. Moyer, Tucson, AZ (US); Stephen L. Watters, Tucson, AZ (US); Jeffrey M. Vernon, Tucson, AZ (US); Alex Dely, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 166 days.

(21) Appl. No.: 16/132,715

(22) Filed: Sep. 17, 2018

(65) Prior Publication Data

US 2020/0089891 A1    Mar. 19, 2020

(51) Int. Cl.
*G06F 21/57* (2013.01)
*G06F 9/445* (2018.01)
*G06F 21/55* (2013.01)
*H04L 29/06* (2006.01)

(52) U.S. Cl.
CPC ........ *G06F 21/577* (2013.01); *G06F 9/44521* (2013.01); *G06F 21/552* (2013.01); *H04L 63/20* (2013.01)

(58) Field of Classification Search
CPC .. G06F 21/577; G06F 21/552; G06F 9/44521; G06F 21/53; G06F 2221/033; G06F 21/566; H04L 63/20
See application file for complete search history.

(56) References Cited

U.S. PATENT DOCUMENTS

| | | | |
|---|---|---|---|
| 8,151,349 B1 * | 4/2012 | Yee | G06F 21/51 726/22 |
| 9,811,665 B1 * | 11/2017 | Xu | G06F 21/562 |
| 2005/0010804 A1 | 1/2005 | Bruening et al. | |

(Continued)

OTHER PUBLICATIONS

"International Application Serial No. PCT US2019 051285, International Search Report dated Nov. 4, 2019", 5 pgs.

(Continued)

*Primary Examiner* — Michael R Vaughan
(74) *Attorney, Agent, or Firm* — Schwegman Lundberg & Woessner, P.A.

(57) ABSTRACT

Methods, systems, and computer-readable mediums for detection of policy violations in an unmodified binary in a virtual environment include receiving the unmodified binary in an executable and linkable format (ELF). The unmodified binary is executed, via an emulator, within the virtual environment. The executing includes determining, by an instruction set emulator, a symbol that is referenced during the executing of the unmodified binary. The symbol, a current state, and a global state is sent to a software policy engine. The software policy engine determines an assertion associated with the symbol. The assertion verifies a policy is enforced. A previous state is updated based on the symbol. The assertion is executed based on the current state, the previous state, and the global state. The assertion is determined to have failed based on the executing the assertion. A warning is logged indicating the failed assertion.

17 Claims, 4 Drawing Sheets

(56) References Cited

U.S. PATENT DOCUMENTS

2015/0278513 A1* 10/2015 Krasin .................. G06F 9/4881
                                                    726/30
2015/0332043 A1   11/2015 Russello
2017/0168865 A1*  6/2017 Swidowski ......... G06F 11/3471
2018/0307837 A1* 10/2018 Ahn ........................ G06F 21/14

OTHER PUBLICATIONS

"International Application Serial No. PCT US2019 051285, Written Opinion dated Nov. 4, 2019", 11 pgs.

"Sensors Overview Android Developer", Anonymous XP055635070, Retrieved from the Internet:https webarchiveorg web 20180915192236 https developer.android.com guide topics sensors sensors_overview on Oct. 23, 2019, (Sep. 15, 2018), 22 pgs.

Watson, Robert NM, "New approaches to operating system security extensibility", University of Cambridge Computer Laboratory Report No. UCAM-CL-TR-818 Cambridge XP055059179, (Apr. 1, 2012), 178 pgs.

* cited by examiner

SOFTWARE POLICY ENGINE IN VIRTUAL ENVIRONMENT

TECHNICAL FIELD

Embodiments discussed herein regard devices, systems, and methods for a cyber evaluation framework.

BACKGROUND

Evaluation of exploitation risk in cyber-physical systems is encumbered by the large and complex input space. Traditional evaluation frameworks concentrate on evaluating software reliability in the context of user interfaces, file input/output (I/O), and network communications. These frameworks also are focused on evaluation of software applications, rather than firmware and/or custom application-specific integrated circuit (ASIC) interactions. In addition, existing frameworks do not have the capability to do integrated cyber-physical system evaluations such as radio frequency (RF), infrared (IR), global positioning system (GPS) signals with environmental factors of gravity, wind, thermal, mechanical stress, etc.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

Figure 1:
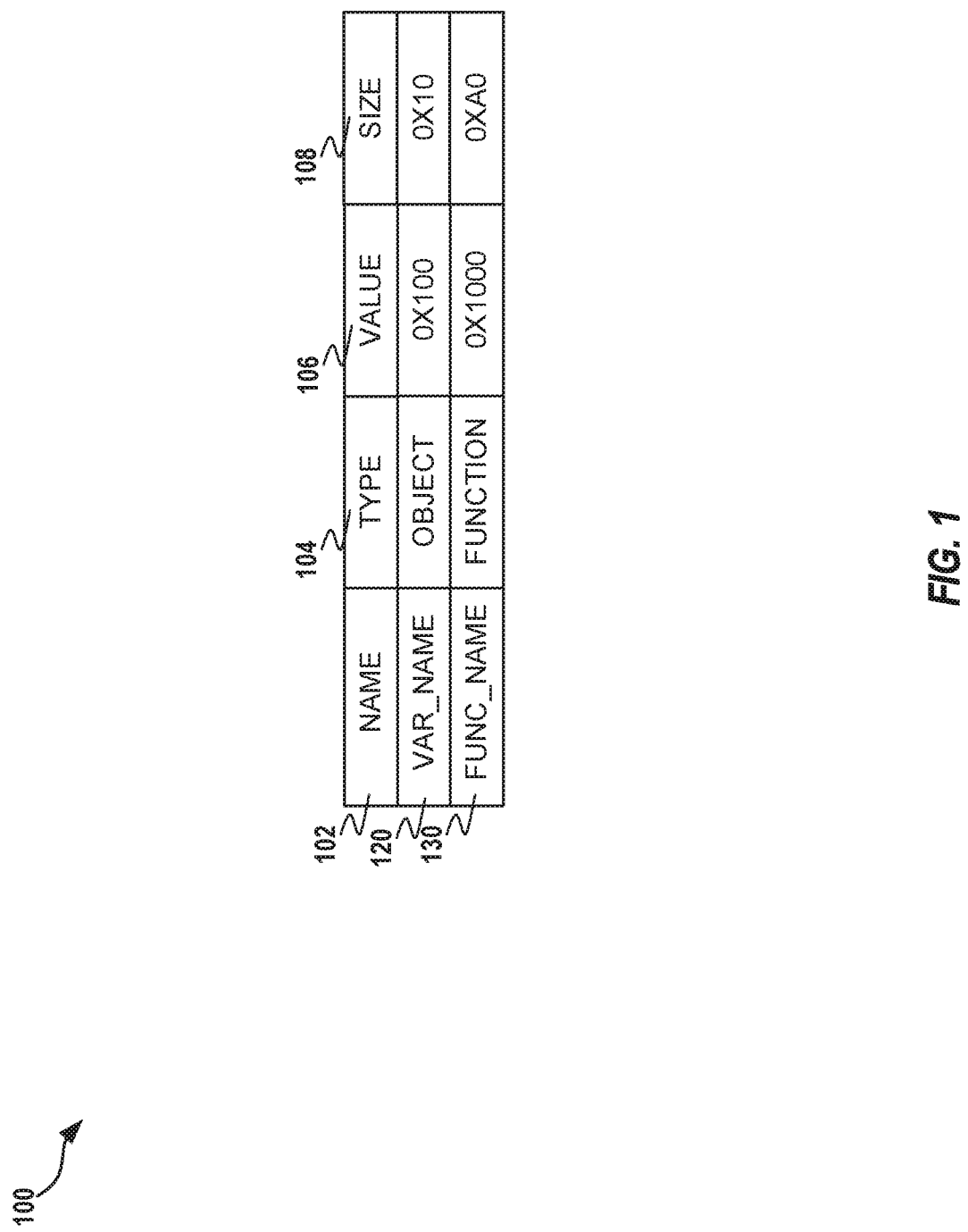
FIG. 1 illustrates, by way of example, an executable and linkable format (ELF) symbol table.

The following detailed description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Embodiments are directed to a framework for evaluating software assurance and cyber exploitation risk in cyber-physical systems. Cyber-physical systems include systems that receive input from the physical world. For example, these systems may include a navigation system, a guidance system, an automated driving vehicle, etc. Embodiments are directed toward emulating cyber-physical systems. Embodiments may include a six degrees of freedom simulation of a binary. As an example of six degrees of freedom, data from various emulated sensors may be used to emulate a real-world environment. The binary is emulated without modification to the binary. Thus, the binary, or software image, that is used in a live system is emulated. In some embodiments, inputs of emulated sensors are varied to test the binary in a real-world setting. The binary may be in the form of an executable and linkable format (ELF). Accordingly, various embodiments may be used to predict the performance and software reliability of a binary.

Embodiments include a software policy engine that is called by the emulator to enforce various policies. Hooks within the policy engine may be used to call the software policy engine. The software policy engine may use symbols from the binary to determine what assertions should be checked. As the policy engine is called while the binary is being run in an emulator, policies are checked at runtime. Example policy statements may include memory coherency assertions such as ensuring memory is written to before being read, software stack protections, heap management enforcements, etc. In addition, assertions on field programmable gate array (FGPA) interactions as defined in a configurable logic interface may be enforced. For example, a sequence of register reads, writes, allowable value ranges, valid addresses, type of allowance bus transactions, etc., may be verified during runtime. Software flow assertions may also be constructed and verified. For example, a calling order of functions/methods, allowable call context, non-reentry, and network message flow may be assertions that are checked during emulation of the binary.

In some embodiments, the assertions may be derived from model based system engineering information content. For example, the order of method calls may be determined from the model based system engineering information. The order of the method calls may then be used to construct an assertion that verifies the order of method calls at runtime. This allows the generation of policy statements/assertions during the design phase that are enforceable during runtime.

Assertions may also be defined inline within the code or the binary. In-lining assertions allow developers to formally define assumptions about the execution context of implemented functionality that is checked during emulation. Such assertions on the context of the execution enable improved maintainability and future integration of legacy system components. This improvement is based on the ability to test the context during emulation when the software is integrated with different components.

As an example, the ELF file format allows in-line software policy assertions. The assertions may depend on the ELF file symbols and file formats rather than the underlying assembly specifics or source software language. Leveraging ELF formats is applicable to integrating of firmware variants. In addition to software policy definition and enforcement capability, embodiments integrate support for concolic testing and code coverage analysis though the generation of files appropriate to this analysis without modification of the software binaries. This capability leverages symbolic information resident in standard ELF files. Furthermore, embodiments may incorporate the capability to do structured fuzzing of interfaces relevant to cyber-physical weapon systems. This includes radar, Infrared and GPS as well as the simulated manipulation of physical environment parameters such as wind, weather, and target maneuvers. For example, embodiments incorporate structured fuzzing of GPS content, timing and frequency. As another example, embodiments use a physics model and a high-fidelity model of infrared, to provide emulated infrared data to the binary being emulated.

FIG. 1 illustrates, by way of example, an executable and linkable format (ELF) symbol table 100. The symbol table 100 includes information that is used to locate and relocate a binary's symbolic definitions and references. Each entry, e.g., entries 120 and 130, in the symbol table 100 represents a symbol. Each symbol includes a name 102, a type 104, a value 106, and a size 108. The name 102 is an index into the binary's symbol string table that holds the character string of the symbol. The type 104, which may be in a data structure, such as an info structure, indicates if the symbol is a method/function, a variable, array, etc. The value 106 is the value associated with the symbol and the size 108 is the size of the symbol. The value 106 may hold an address or an offset that points to the value of the symbol. As described in greater detail below, the symbol entry, e.g., 120 or 130, or portions of the entry may be used by a software policy engine to determine assertions associated with a symbol.

Figure 2:
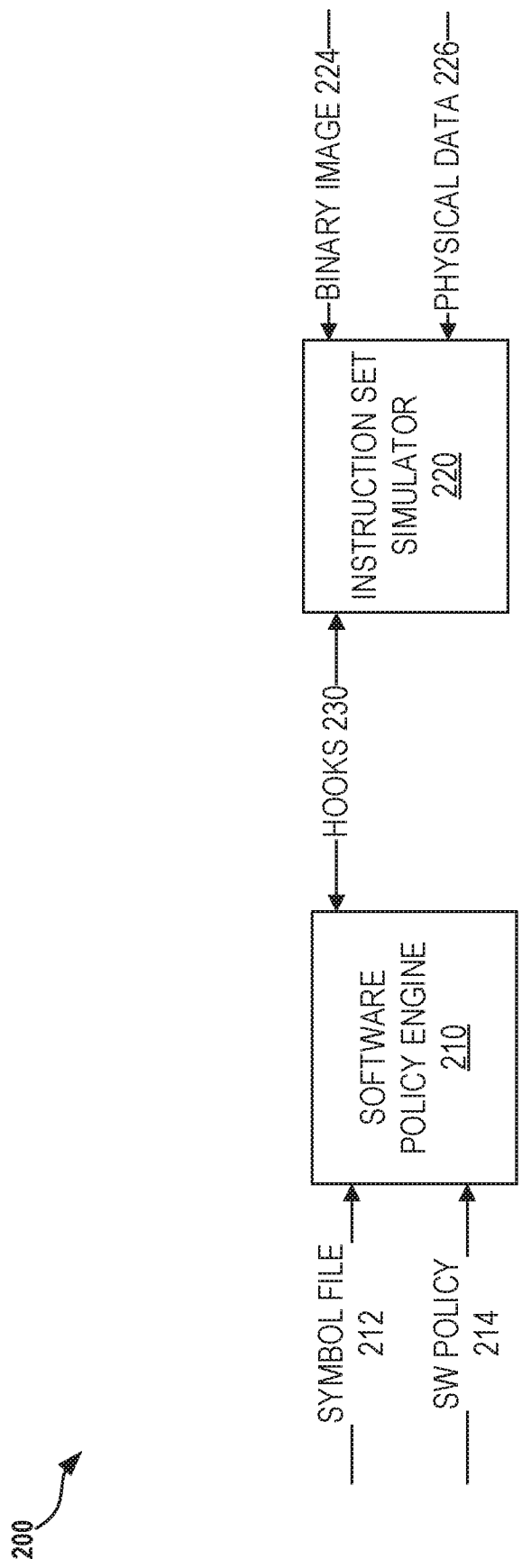
FIG. 2 illustrates, by way of example, a system for detection of policy violations in an unmodified binary in a virtual environment.

FIG. 2 illustrates, by way of example, a system 200 for detection of policy violations in an unmodified binary in a virtual environment. The system 200 includes an instruction set simulator 220, which may be part of an emulator, that receives a binary image 224 that is executed. The binary image 224 may be the unmodified binary that will be used on live systems. For example, the binary image 224 may be an ELF binary. The instruction set simulator 220 also receives physical data 226. The physical data 226 may include data from emulated sensors. Emulated sensors may include radar, infrared and GPS. In addition, the physical data 226 may include simulated manipulation of physical environment data such as wind, weather, and target maneuvers. For example, embodiments incorporate structured fuzzing of GPS content, timing and frequency.

A software policy engine 210 may configure hooks 230 within the instruction set simulator 220. For example, the software policy engine 210 may have a hook that is called each time a symbol is accessed in the instruction set simulator 220. The software policy engine 210 may receive a symbol file 212, which may be part of the binary image 224. The symbol file 212 may be parsed and hooks 230 with the instruction set simulator 220 may be configured based on the symbols. The symbol file 212 may include entries such as those described with respect to FIG. 1.

The software policy engine 210 may also receive a software policy 214. The software policy 214 may include assertions of software policy statements that are used to enforce the software policy 214 at runtime. The assertions may include memory assertions, network assertions, interface requirements assertions, software flow assertions, and inline software assertions. When the binary image 224 is emulated, the instruction set simulator 220 determines what instructions to run. As part of this determination, the instructions, method/function calls, variable access, memory addresses, etc., are known to the instruction set simulator 220. The instruction set simulator 220 passes this information to the software policy engine 210 via the hook 230. As an example, the hook 230 may be called prior to the instruction set simulator 220 executing each instruction.

As part of calling in the hook, the instruction set simulator 220 may pass various data to the software policy engine 210. For example, the method call, variable name, memory write address, memory read address, register accesses, etc., may passed to the software policy engine 210. The software policy engine 210 uses this information to determine any related assertions. For any assertion found, the assertion is called to ensure the corresponding software policy statement is being properly enforced. As an example, the method name may be used to find assertions associated with that method. One assertion may be a software flow assertion that checks to ensure that a needed method was called before the current method. The assertion may use a current state or a previous state to ensure that the needed method was called prior to the current method. If the needed method was not called, a message may be logged indicating the failure. In addition, the software policy engine 210 may halt the emulation of the binary image 224 based on a failed assertion.

As the binary image 224 is emulated, various assertions are called. Emulated sensor data may be fed into the emulation of the binary image 224. As the binary image 224 is emulated, the assertions of the software policy 214 are executed during runtime. Any failures will be logged, along with corresponding data such as current state of the emulation, previous state, global state, memory contents, symbol data, etc. Accordingly, the binary image 224 may be tested as part of emulating the binary image 224.

Figure 3:
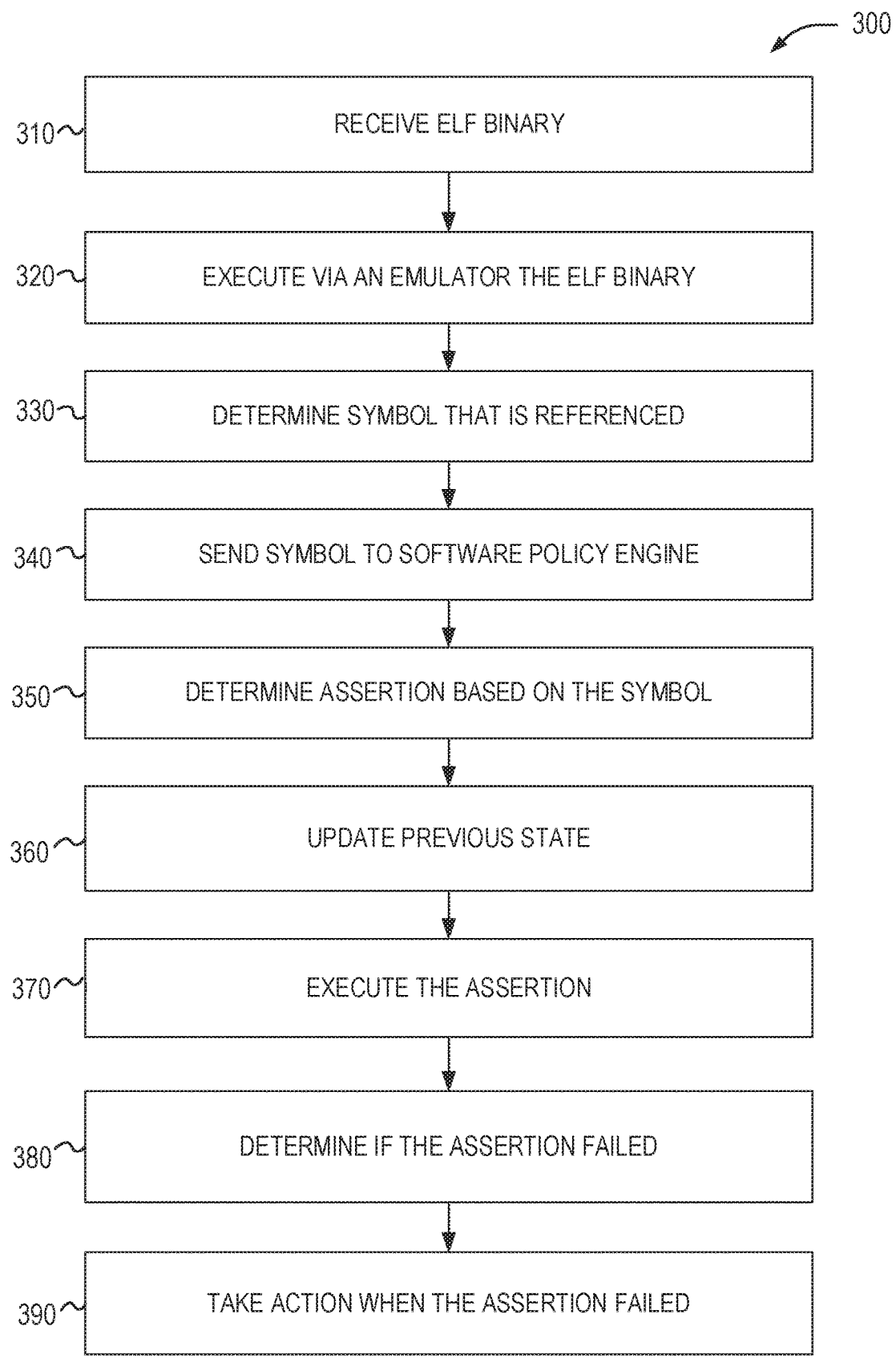
FIG. 3 illustrates, by way of example, a process flow for detection of policy violations in an unmodified binary in a virtual environment.

FIG. 3 illustrates, by way of example, a process flow 300 for detection of policy violations in an unmodified binary in a virtual environment. The process 300 may be executed on a computing device. At 310, an unmodified binary in an executable and linkable format (ELF) is received. At 320, the unmodified binary is executed, via an emulator, within a virtual environment. The executing includes, at 330, determining, by an instruction set emulator, a symbol that is referenced during the executing of the unmodified binary. The symbol may be, for example, a method/function that is being executed or a variable that is being accessed.

At 340, the symbol is sent to a software policy engine. In addition to the symbol, a current state of the executing of the unmodified binary and a global state of the executing of the unmodified binary may also be sent to the software policy engine. At 350, the software policy engine determines an assertion associated with the symbol. At 360, a previous state of the executing of the unmodified binary is updated based on the symbol. For example, the previous state may include a list of memory addresses that have been written.

At 370, the assertion is executed based on the current state, the previous state, and the global state of the execution of the unmodified binary. Executing the assertion verifies a policy is enforced. Various policies may be enforced. Memory assertions are one type of policy and may include verifying memory is written to before being read, software stack protections, and heap management enforcements. As an example, a data associated with a symbol may indicate a read address where data will be read. The data associated with the symbol includes the current state, global state, and a previous state of the execution of the binary. The assertion can verify that a previous command had written data to the read address. If the read address has not been previously written, the assertion fails.

As another, an assertion can verify that a stack overrun has not occurred by looking at the stack frame and unwinding the stack. The assertion can verify that nothing was written to the stack outside of the memory area of the stack. Another example of assertions are logic interface requirements. For example, FPGA interactions may be defined via a configurable logic interface specification. The valid interactions may indicate valid sequences of register reads and writes, allowable value ranges, valid addresses, and types of allowable bus transactions. In addition, an assertion may verify multiple policy statements. For example, a sequence of register reads may be determined based on the previous state and the symbol. The sequence of register reads may be validated to ensure the sequence of reads is consistent with the interface requirements. In addition, a sequence of register writes may be determined based on the previous state and the symbol. The sequence of register writes may also be validated. In addition, any intermixing of reads and writes may also be verified. The assertion may also check the data values being written and read are within a valid range. A data value for one of the sequence of register writes may be determined to not be within a valid range. The assertion then fails based on determining the data value is not with the valid range.

Software flow assertions are another example of assertions. Software flow assertions may verify the ordering of method calls, allowable call context, non-reentry into a method, and network message flow. In an example, software flow assertions may be derived from a sequence diagram. For example, sequence diagrams can model software control flow. Software policies may be derived, for example from the sequence diagrams, that assert the flow of software control and verifies the control flow integrity. Documents that describe the software flow, such as model based systems engineering documents, may be used to automatically generate the software flow assertions. For example, a sequence diagram may include an order of method calls indicating that a first method is called after a second method. An assertion can be generated based on a symbol of the first method. This assertion can verify that the second method was called prior to the first method based on the emulation state, such as the previous state, current state, or global state of the execution of the binary.

Assertions may also be defined in-line with the binary itself. The software policy engine may receive the binary and extract the assertions and associated symbol from the binary. For example, a pragma may be used to embed information regarding an assertion and the associated symbol. The assertion may be indicated by a name that is used by the software policy engine to locate and execute the indicated assertion. In another example, the assertion may be defined within the pragma using a markup language.

At 380, if the assertion failed is determined based on executing the assertion which indicates a violation of the policy. Executing the assertion may access the previous state, current state, or global state to determine if there has been any policy violation.

At 390, a warning is logged indicating the failed assertion. The warning may include the symbol, the current state, the previous state, and the global state of the execution of the binary. In addition, a failed assertion may also trigger a halt to the emulation. In this example, the software policy engine may provide a halt command to the emulator. The emulator, upon receiving the halt command, stops the emulation of the binary.

As described above, the binary may be a binary that will be run in a system that receives real-time data from sensors. To test this, the emulator may receive physical data from an emulated physical sensor. The emulated physical sensor may be one of a wind sensor, a thermal sensor, or a mechanical stress sensor. The physical data may then be used by the executing binary. To further test the binary, the physical data may be modified by a first random amount. The first random amount may be included in the current state of the execution of the binary.

In addition to a physical sensor, the emulator may receive location data from a location sensor. The location data may be modified by a second random amount. The current state may include the modified location data. Code associated with the symbol references the physical data or the location data. Assertions may verify that the data is valid or that the binary properly handles any invalid data.

Software policies may be used as a way to define the assumptions about the execution environment constraints for a unit of portability or microservice of a modular open systems architecture. That is, the policies can form the basis for a software contract between the user of the service or module and the author of the service or module. Assertions may be created and employed that verify the software contract during runtime, such as during emulation.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 4:
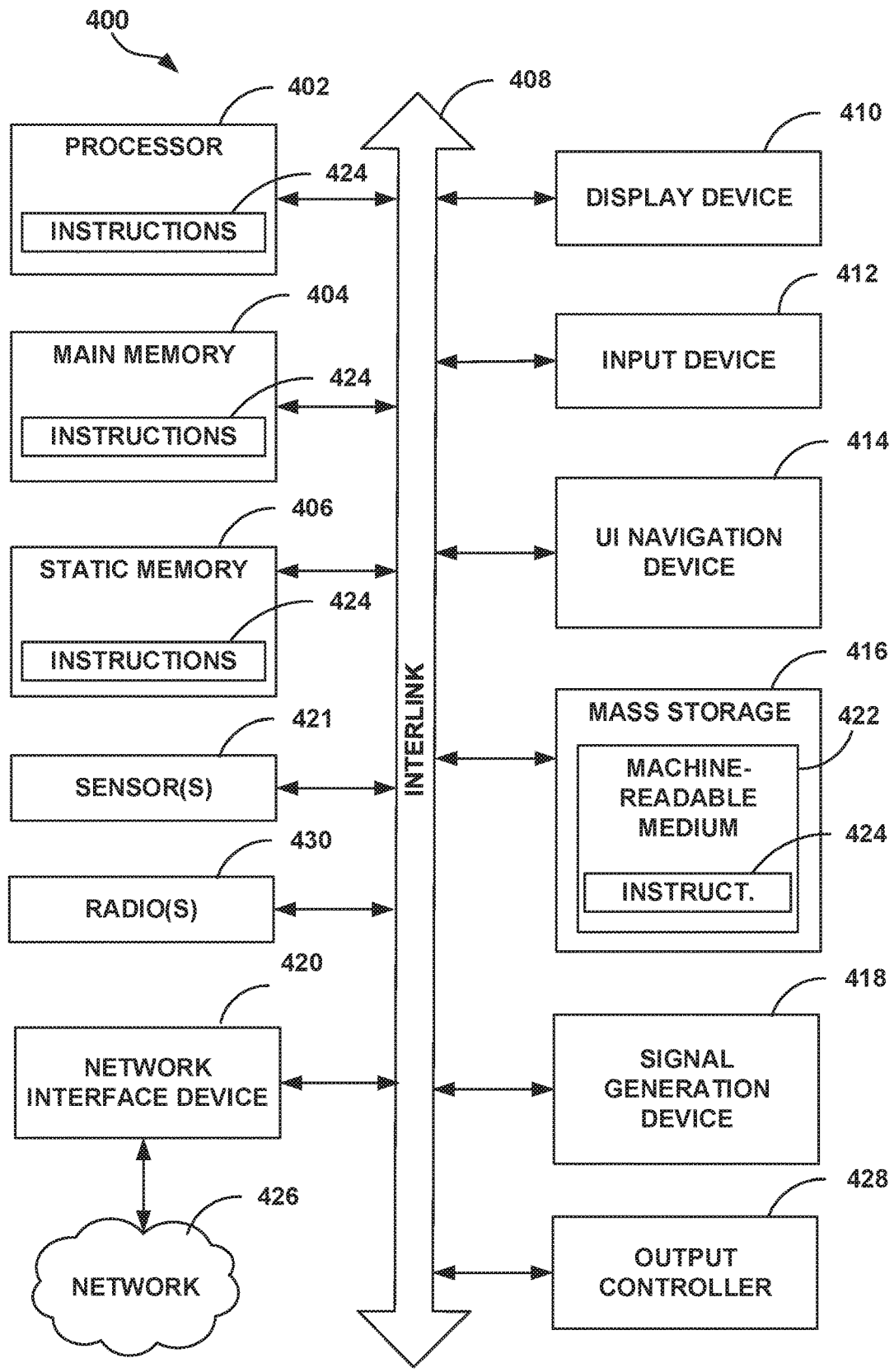
FIG. 4 illustrates, by way of example, a block diagram of an embodiment of a machine on which one or more of the methods, such as those discussed herein, can be implemented.

FIG. 4 illustrates, by way of example, a block diagram of an embodiment of a machine in the example form of a computer system 400 within which instructions, for causing the machine to perform any one or more of the methodologies discussed herein, may be executed. In one or more embodiments, one or more items of the system, such as the software policy engine 210 or the instruction set simulator 220, can be implemented by the machine 400. In alternative embodiments, the machine 400 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a mass storage unit 416, a signal generation device 418 (e.g., a speaker), a network interface device 420, and radios 430 such as Bluetooth, WWAN, WLAN, and NFC, permitting the application of security controls on such protocols.

The mass storage unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLES AND ADDITIONAL NOTES

Example 1 is non-transitory machine-readable mediums including instructions that, when executed by processing circuitry of a machine, configure the processing circuitry for detection of policy violations in an unmodified binary in a virtual environment, the processing circuitry configured to perform operations comprising: receiving the unmodified binary, the unmodified binary in an executable and linkable format (ELF); executing, via an emulator, the unmodified binary within the virtual environment, wherein the executing comprises: determining, by an instruction set emulator, a symbol that is referenced during the executing of the unmodified binary; sending, to a software policy engine, the symbol, a current state of the executing of the unmodified binary, and a global state of the executing of the unmodified binary; determining, by the software policy engine, an assertion associated with the symbol, the assertion verifying a policy is enforced; updating a previous state of the executing of the unmodified binary based on the symbol; executing the assertion based on the current state of the executing of the unmodified binary, the previous state of the executing of the unmodified binary, and the global state of the executing of the unmodified binary; determining the assertion failed based on the executing the assertion indicating a violation of the policy; and logging a warning indicating the failed assertion, the warning including the symbol and the current state of the executing of the unmodified binary.

In Example 2, the subject matter of Example 1 includes, wherein the operations further comprise: sending, from the software policy engine, an indication to halt execution of the unmodified binary to the emulator; and halting the execution of the unmodified binary based on the indication to halt.

In Example 3, the subject matter of Examples 1-2 includes, wherein the operations further comprise: receiving, by the emulator, physical data from an emulated physical sensor; modifying the physical data by a first random amount, wherein the current state of the executing of the unmodified binary comprises the modified physical data; receiving, by the emulator, location data from a location sensor; modifying the location data by a second random amount, wherein the current state of the executing of the unmodified binary comprises the modified location data, and wherein code associated with the symbol references the physical data or the location data.

In Example 4, the subject matter of Example 3 includes, wherein the emulated physical sensor is one of a wind sensor, a thermal sensor, or a mechanical stress sensor.

In Example 5, the subject matter of Examples 1-4 includes, wherein the operations further comprise: receiving, by the software policy engine, the unmodified binary; and extracting the assertion and a symbol associated with the assertion from the unmodified binary.

In Example 6, the subject matter of Examples 1-5 includes, wherein the operations executing the assertion comprise: determining a memory read address associated with the symbol based on the current state of the executing of the unmodified binary; determining if the memory read address has previously been written to based on the previous state of the executing of the unmodified binary; and failing the assertion based on determining the memory read address has not been previously written.

In Example 7, the subject matter of Examples 1-6 includes, wherein the operations further comprise: receiving a sequence diagram of method calls, the sequence diagram indicating a first method is called after a second method; generating the assertion associated with a symbol of the first method, the assertion verifies that the second method was called prior to the first method based on the previous state of the executing of the unmodified binary.

In Example 8, the subject matter of Examples 1-7 includes, wherein the operations executing the assertion comprise: determining a sequence of register reads based on the previous state of the executing of the unmodified binary and the symbol; determining the sequence of register reads is valid; determining a sequence of register writes based on the previous state of the executing of the unmodified binary and the symbol; determining the sequence of register writes is valid; determining a data value for one of the sequence of register writes is not within a valid range; and failing the assertion based on determining the data value is not with the valid range.

Example 9 is a method for detection of policy violations in an unmodified binary in a virtual environment, the method comprising: receiving the unmodified binary, the unmodified binary in an executable and linkable format (ELF); executing, via an emulator, the unmodified binary within the virtual environment, wherein the executing comprises: determining, by an instruction set emulator, a symbol that is referenced during the executing of the unmodified binary; sending, to a software policy engine, the symbol, a current state of the executing of the unmodified binary, and a global state of the executing of the unmodified binary; determining, by the software policy engine, an assertion associated with the symbol, the assertion verifying a policy is enforced; updating a previous state of the executing of the unmodified binary based on the symbol; executing the assertion based on the current state of the executing of the unmodified binary, the previous state of the executing of the unmodified binary, and the global state of the executing of the unmodified binary; determining the assertion failed based on the executing the assertion indicating a violation of the policy; and logging a warning indicating the failed assertion, the warning including the symbol and the current state of the executing of the unmodified binary.

In Example 10, the subject matter of Example 9 includes, sending, from the software policy engine, an indication to halt execution of the unmodified binary to the emulator; and halting the execution of the unmodified binary based on the indication to halt.

In Example 11, the subject matter of Examples 9-10 includes, receiving, by the emulator, physical data from an emulated physical sensor; modifying the physical data by a first random amount, wherein the current state of the executing of the unmodified binary comprises the modified physical data; receiving, by the emulator, location data from a location sensor; modifying the location data by a second random amount, wherein the current state of the executing of the unmodified binary comprises the modified location data, and wherein code associated with the symbol references the physical data or the location data.

In Example 12, the subject matter of Example 11 includes, wherein the emulated physical sensor is one of a wind sensor, a thermal sensor, or a mechanical stress sensor.

In Example 13, the subject matter of Examples 9-12 includes, receiving, by the software policy engine, the unmodified binary; and extracting the assertion and a symbol associated with the assertion from the unmodified binary.

In Example 14, the subject matter of Examples 9-13 includes, wherein executing the assertion comprises: determining a memory read address associated with the symbol based on the current state of the executing of the unmodified binary; determining if the memory read address has previously been written to based on the previous state of the executing of the unmodified binary; and failing the assertion based on determining the memory read address has not been previously written.

In Example 15, the subject matter of Examples 9-14 includes, receiving a sequence diagram of method calls, the sequence diagram indicating a first method is called after a second method; generating the assertion associated with a symbol of the first method, the assertion verifies that the second method was called prior to the first method based on the previous state of the executing of the unmodified binary.

In Example 16, the subject matter of Examples 9-15 includes, wherein executing the assertion comprises: determining a sequence of register reads based on the previous state of the executing of the unmodified binary and the symbol; determining the sequence of register reads is valid; determining a sequence of register writes based on the previous state of the executing of the unmodified binary and the symbol; determining the sequence of register writes is valid; determining a data value for one of the sequence of register writes is not within a valid range; and failing the assertion based on determining the data value is not with the valid range.

Example 17 is a system for detection of policy violations in an unmodified binary in a virtual environment, the system comprising: processing circuitry; a memory including program instructions that, when executed the processing circuitry, configure the processing circuitry to: receive the unmodified binary, the unmodified binary in an executable and linkable format (ELF); execute, via an emulator, the unmodified binary within the virtual environment, wherein the executing comprises: determine, by an instruction set emulator, a symbol that is referenced during the executing of the unmodified binary; send, to a software policy engine, the symbol, a current state of the executing of the unmodified binary, and a global state of the executing of the unmodified binary; determine, by the software policy engine, an assertion associated with the symbol, the assertion verifying a policy is enforced; update a previous state of the executing of the unmodified binary based on the symbol; execute the assertion based on the current state of the executing of the unmodified binary, the previous state of the executing of the unmodified binary, and the global state of the executing of the unmodified binary; determine the assertion failed based on the executing the assertion indicating a violation of the policy; and log a warning indicating the failed assertion, the warning including the symbol and the current state of the executing of the unmodified binary.

In Example 18, the subject matter of Example 17 includes, wherein the processing circuitry is further configured to: send, from the software policy engine, an indication to halt execution of the unmodified binary to the emulator; and halt the execution of the unmodified binary based on the indication to halt.

In Example 19, the subject matter of Examples 17-18 includes, wherein the processing circuitry is further configured to: receive, by the emulator, physical data from an emulated physical sensor; modify the physical data by a first random amount, wherein the current state of the executing of the unmodified binary comprises the modified physical data; receive, by the emulator, location data from a location sensor; modify the location data by a second random amount, wherein the current state of the executing of the unmodified binary comprises the modified location data, and wherein code associated with the symbol references the physical data or the location data.

In Example 20, the subject matter of Example 19 includes, wherein the emulated physical sensor is one of a wind sensor, a thermal sensor, or a mechanical stress sensor.

In Example 21, the subject matter of Examples 17-20 includes, wherein the processing circuitry is further configured to: receive, by the software policy engine, the unmodified binary; and extract the assertion and a symbol associated with the assertion from the unmodified binary.

In Example 22, the subject matter of Examples 17-21 includes, wherein to execute the assertion the processing circuitry is further configured to: determine a memory read address associated with the symbol based on the current state of the executing of the unmodified binary; determine if the memory read address has previously been written to based on the previous state of the executing of the unmodified binary; and fail the assertion based on determining the memory read address has not been previously written.

In Example 23, the subject matter of Examples 17-22 includes, wherein the processing circuitry is further configured to: receive a sequence diagram of method calls, the sequence diagram indicating a first method is called after a second method; generate the assertion associated with a symbol of the first method, the assertion verifies that the second method was called prior to the first method based on the previous state of the executing of the unmodified binary.

In Example 24, the subject matter of Examples 17-23 includes, wherein to execute the assertion the processing circuitry is further configured to: determine a sequence of register reads based on the previous state of the executing of the unmodified binary and the symbol; determine the sequence of register reads is valid; determine a sequence of register writes based on the previous state of the executing of the unmodified binary and the symbol; determine the sequence of register writes is valid; determine a data value for one of the sequence of register writes is not within a valid range; and fail the assertion based on determining the data value is not with the valid range.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. Non-transitory machine-readable mediums including instructions that, when executed by processing circuitry of a machine, configure the processing circuitry for detection of policy violations in an unmodified binary in a virtual environment, the processing circuitry configured to perform operations comprising:
   receiving the unmodified binary, the unmodified binary in an executable and linkable format (ELF);
   executing, via an emulator, the unmodified binary within the virtual environment, wherein the executing comprises:
   determining, by an instruction set emulator, a symbol that is referenced during the executing of the unmodified binary;
   sending, to a software policy engine, the symbol, a current state of the executing of the unmodified binary, and a global state of the executing of the unmodified binary;
   determining, by the software policy engine, an assertion associated with the symbol, the assertion verifying a policy is enforced;
   updating a previous state of the executing of the unmodified binary based on the symbol;
   executing the assertion based on the current state of the executing of the unmodified binary, the previous state of the executing of the unmodified binary, and the global state of the executing of the unmodified binary;
   determining the assertion failed based on the executing the assertion, a failure indicating a violation of the policy;
   logging a warning indicating the failed assertion, the warning including the symbol and the current state of the executing of the unmodified binary;
   receiving, by the emulator, physical data from an emulated physical sensor;
   modifying the physical data by a first random amount, wherein the current state of the executing of the unmodified binary comprises the modified physical data;
   receiving, by the emulator, location data from a location sensor; and
   modifying the location data by a second random amount, wherein the current state of the executing of the unmodified binary comprises the modified location data, and wherein code associated with the symbol references the physical data or the location data.

2. The non-transitory machine-readable mediums of claim 1, wherein the operations further comprise:
   sending, from the software policy engine, an indication to halt execution of the unmodified binary to the emulator; and
   halting the execution of the unmodified binary based on the indication to halt.

3. The non-transitory machine-readable mediums of claim 1, wherein the emulated physical sensor is one of a wind sensor, a thermal sensor, or a mechanical stress sensor.

4. The non-transitory machine-readable mediums of claim 1, wherein the operations further comprise:
   receiving, by the software policy engine, the unmodified binary; and
   extracting the assertion and a symbol associated with the assertion from the unmodified binary.

5. The non-transitory machine-readable mediums of claim 1, wherein the operations executing the assertion comprise:
   determining a memory read address associated with the symbol based on the current state of the executing of the unmodified binary;
   determining if the memory read address has previously been written to based on the previous state of the executing of the unmodified binary; and
   failing the assertion based on determining the memory read address has not been previously written.

6. The non-transitory machine-readable mediums of claim 1, wherein the operations further comprise:
   receiving a sequence diagram of method calls, the sequence diagram indicating a first method is called after a second method;
   generating the assertion associated with a symbol of the first method, the assertion verifies that the second method was called prior to the first method based on the previous state of the executing of the unmodified binary.

7. The non-transitory machine-readable mediums of claim 1, wherein the operations executing the assertion comprise:
   determining a sequence of register reads based on the previous state of the executing of the unmodified binary and the symbol;
   determining the sequence of register reads is valid;
   determining a sequence of register writes based on the previous state of the executing of the unmodified binary and the symbol;
   determining the sequence of register writes is valid;
   determining a data value for one of the sequence of register writes is not within a valid range; and
   failing the assertion based on determining the data value is not with the valid range.

8. A method for detection of policy violations in an unmodified binary in a virtual environment, the method comprising:
   receiving the unmodified binary, the unmodified binary in an executable and linkable format (ELF);

executing, via an emulator, the unmodified binary within the virtual environment, wherein the executing comprises:

determining, by an instruction set emulator, a symbol that is referenced during the executing of the unmodified binary;

sending, to a software policy engine, the symbol, a current state of the executing of the unmodified binary, and a global state of the executing of the unmodified binary;

determining, by the software policy engine, an assertion associated with the symbol, the assertion verifying a policy is enforced;

updating a previous state of the executing of the unmodified binary based on the symbol;

executing the assertion based on the current state of the executing of the unmodified binary, the previous state of the executing of the unmodified binary, and the global state of the executing of the unmodified binary;

determining the assertion failed based on the executing the assertion, a failure indicating a violation of the policy;

logging a warning indicating the failed assertion, the warning including the symbol and the current state of the executing of the unmodified binary;

determining a memory read address associated with the symbol based on the current state of the executing of the unmodified binary;

determining if the memory read address has previously been written to based ori the previous state of the executing of the unmodified binary; and failing the assertion based on determining the memory read address has not been previously written.

9. The method of claim 8, further comprising:
sending, from the software policy engine, an indication to halt execution of the unmodified binary to the emulator; and
halting the execution of the unmodified binary based on the indication to halt.

10. The method of claim 8, further comprising:
receiving, by the emulator, physical data from an emulated physical sensor;
modifying the physical data by a first random amount, wherein the current state of the executing of the unmodified binary comprises the modified physical data;
receiving, by the emulator, location data from a location sensor;
modifying the location data by a second random amount, wherein the current state of the executing of the unmodified binary comprises the modified location data, and wherein code associated with the symbol references the physical data or the location data.

11. The method of claim 10, wherein the emulated physical sensor is one of a wind sensor, a thermal sensor, or a mechanical stress sensor.

12. The method of claim 8, further comprising:
receiving, by the software policy engine, the unmodified binary; and
extracting the assertion and a symbol associated with the assertion from the unmodified binary.

13. The method of claim 8, further comprising:
receiving a sequence diagram of method calls, the sequence diagram indicating a first method is called after a second method;
generating the assertion associated with a symbol of the first method, the assertion verifies that the second method was called prior to the first method based on the previous state of the executing of the unmodified binary.

14. The method of claim 8, wherein executing the assertion comprises:
determining a sequence of register reads based on the previous state of the executing of the unmodified binary and the symbol;
determining the sequence of register reads is valid;
determining a sequence of register writes based on the previous state of the executing of the unmodified binary and the symbol;
determining the sequence of register writes is valid;
determining a data value for one of the sequence of register writes is not within a valid range; and
failing the assertion based on determining the data value is not with the valid range.

15. A system for detection of policy violations in an unmodified binary in a virtual environment, the system comprising:
processing circuitry;
a memory including program instructions that, when executed the processing circuitry, configure the processing circuitry to:
receive the unmodified binary, the unmodified binary in an executable and linkable format execute; via an emulator, the unmodified binary within the virtual environment, wherein the execution comprises:
determine, by an instruction set emulator, a symbol that is referenced during the executing of thy: unmodified binary;
send, to a software policy engine, the symbol, a current state of the executing of the unmodified binary, and a global state of the executing of the unmodified binary;
determine, by the software policy engine, an assertion associated with the symbol, the assertion verifying a policy is enforced;
update a previous state of the executing of the unmodified binary based on the symbol;
execute the assertion based on the current state of the executing of the unmodified binary, the previous state of the executing of the unmodified binary, and the global state of the executing of the unmodified binary;
determine the assertion failed based on the execution the assertion, a failure indicating a violation of the policy;
log a warning indicating the failed assertion, the warning including the symbol and the current state of the executing of the unmodified binary;
determine a sequence of register reads based on the previous state of the executing of the unmodified binary and the symbol;
determine the sequence of register reads is valid;
determine a sequence of register writes based on the previous state of the executing of the unmodified binary and the symbol;
determine the sequence of register writes is valid;
determine a data value for one of the sequence of register writes is not within a valid range; and
fail the assertion based on determining the data value is not with the valid range;
wherein the processing circuitry is further configured to:
receive, by the emulator, physical data from an emulated physical sensor;
modify the physical data by a first random amount, wherein the current state of the executing of the unmodified binary comprises the modified physical data;

receive, by the emulator, location data from a location sensor;

modify the location data by a second random amount, wherein the current state of the executing of the unmodified binary comprises the modified location data, and wherein code associated with the symbol references the physical data or the location data.

16. The system of claim 15, wherein the processing circuitry is further configured to:

send, from the software policy engine, an indication to halt execution of the unmodified binary to the emulator; and halt the execution of the unmodified binary based on the indication to halt.

17. The system of claim 15, wherein the emulated physical sensor is one of a wind sensor, a thermal sensor, or a mechanical stress sensor.

* * * * *

UNITED STATES PATENT AND TRADEMARK OFFICE
CERTIFICATE OF CORRECTION

PATENT NO. : 10,929,542 B2
APPLICATION NO. : 16/132715
DATED : February 23, 2021
INVENTOR(S) : Jones et al.

Page 1 of 1

It is certified that error appears in the above-identified patent and that said Letters Patent is hereby corrected as shown below:

In the Claims

In Column 15, Line 30, in Claim 8, delete "ori" and insert --on-- therefor

In Column 16, Line 26, in Claim 15, delete "format execute;" and insert --format (ELF); execute,-- therefor In Column 16, Line 30, in Claim 15, delete "thy:" and insert --the-- therefor Signed and Sealed this
Tenth Day of August, 2021

Drew Hirshfeld
*Performing the Functions and Duties of the
Under Secretary of Commerce for Intellectual Property and
Director of the United States Patent and Trademark Office*